United States Patent
Yamada (10) Patent No.: US 9,724,960 B2
(45) Date of Patent: Aug. 8, 2017

(54) AUTOMOBILE WHEEL DISK

(71) Applicant: CENTRAL MOTOR WHEEL CO., LTD., Anjo-shi (JP)

(72) Inventor: Shinji Yamada, Miyoshi (JP)

(73) Assignee: Central Motor Wheel Co., Ltd., Anjo-Shi (JP)

( * ) Notice: Subject to any disclaimer, the term of this patent is extended or adjusted under 35 U.S.C. 154(b) by 0 days.

(21) Appl. No.: 15/118,940

(22) PCT Filed: Mar. 11, 2014

(86) PCT No.: PCT/JP2014/056290
§ 371 (c)(1),
(2) Date: Aug. 15, 2016

(87) PCT Pub. No.: WO2015/136617
PCT Pub. Date: Sep. 17, 2015

(65) Prior Publication Data
US 2016/0375721 A1    Dec. 29, 2016

(51) Int. Cl.
*B60B 3/14*    (2006.01)
*B60B 3/04*    (2006.01)
(Continued)

(52) U.S. Cl.
CPC .............. *B60B 3/14* (2013.01); *B21D 53/30* (2013.01); *B60B 3/04* (2013.01); *B60B 27/065* (2013.01);
(Continued)

(58) Field of Classification Search
CPC  B60B 3/14; B60B 27/065; B60B 3/04; B60B 7/06; B60B 2360/10;
(Continued)

(56) References Cited

U.S. PATENT DOCUMENTS 5,600,992 A * 2/1997 Kanazawa ............. B21D 19/08
                                                              72/352
6,372,063 B1 * 4/2002 Grillon .................... B21J 5/004
                                                              148/320
(Continued)

FOREIGN PATENT DOCUMENTS

| GB | 2 031 816 A | 4/1980 |
|---|---|---|
| JP | S60-132902 U | 9/1985 |
| JP | S62-103602 U | 7/1987 |

(Continued)

OTHER PUBLICATIONS

International Search Report (with English Translation) and Written Opinion, International Application No. PCT/JP2014/056290, dated Jun. 10, 2014 (9 pages).

*Primary Examiner* — S. Joseph Morano
*Assistant Examiner* — Jean Charleston
(74) *Attorney, Agent, or Firm* — Burr & Brown, PLLC (57) ABSTRACT

In a step of forming a fixing groove for a wheel disk (20), an inner circumferential end of a first hub hole peripheral portion (41) is squeezed by a protruding portion (D21) of a back die (D2) and a dent portion (D31) of a front die (D3). In this manner, a fixing groove (50) is formed in a back surface of the first hub hole peripheral portion (41). Along with this, an excess material is pushed into the dent portion (D31) so that a protrusion (51) is formed on a front surface of the first hub hole peripheral portion (41). Thus, without requiring a step of cutting the excess material, the fixing groove (50) can be formed in a back surface of a hub hole peripheral portion (30).

3 Claims, 10 Drawing Sheets

(51) Int. Cl.
*B21D 53/30* (2006.01)
*B60B 27/06* (2006.01)
*B60B 7/06* (2006.01)

(52) U.S. Cl.
CPC ............ *B60B 7/06* (2013.01); *B60B 2310/213* (2013.01); *B60B 2360/10* (2013.01); *B60B 2900/112* (2013.01)

(58) Field of Classification Search
CPC ........ B60B 2900/112; B60B 2310/213; B21D 53/30; B21D 28/30; B21K 1/32; B21K 1/28; B21K 1/30
USPC ....... 301/65.101, 63.103, 63.107; 29/894.32, 29/894.321, 894.325, 894.36, 894.361, 29/894.362; 72/353.2, 381
See application file for complete search history.

(56) References Cited

U.S. PATENT DOCUMENTS

| | | | | |
|---|---|---|---|---|
| 6,397,652 | B1* | 6/2002 | Sollami | B21J 5/02 72/353.2 |
| 7,658,007 | B2* | 2/2010 | Melbinger | B21D 53/30 29/894.3 |
| 8,770,671 | B2* | 7/2014 | Nyunoya | B60B 3/007 301/63.101 |
| 9,511,623 | B2* | 12/2016 | Abe | B60B 3/04 |
| 2004/0177507 | A1* | 9/2004 | Shimizu | B21K 1/28 29/894.353 |
| 2011/0198916 | A1* | 8/2011 | Chashiro | B60B 3/04 301/95.11 |

FOREIGN PATENT DOCUMENTS

JP 2003-126934 A 5/2003

* cited by examiner

AUTOMOBILE WHEEL DISK

TECHNICAL FIELD

The present invention relates to a wheel disk, which is a component of an automobile wheel.

BACKGROUND ART

In general, an automobile steel wheel, which is manufactured by performing press working on a metal plate, includes a wheel rim configured to retain a tire, and a wheel disk to be coupled to an axle hub. The wheel rim and the wheel disk are formed integrally with each other by welding the wheel rim on an outer circumference of the wheel disk. A hub coupling portion being a region to be coupled to the axle hub is formed at a center of the wheel disk. A hub hole and bolt holes arranged around the hub hole at equal intervals are formed in the hub coupling portion. The automobile wheel is fastened to the axle hub in such a manner that nuts are fastened to stud bolts fixed to the axle hub under a state in which a cylindrical portion formed at a distal end of the axle hub is inserted through the hub hole and the stud bolts are inserted through the bolt holes.

A hub cap (also referred to as a hub ornament) is mounted to the hub coupling portion from a front surface side of the wheel disk so as to cover the hub hole. The cylindrical portion of the axle hub can be covered with the hub cap. For example, in Patent Literature 1, a technology of mounting the hub cap is proposed. An automobile wheel proposed in Patent Literature 1 has such a configuration that a hub hole is formed into a toothed gear shape so that gaps are defined intermittently between a cylindrical portion of an axle hub and a peripheral edge of the hub hole. Further, coupling protruding portions of the hub cap are pushed into the gaps, thereby fixing the hub cap. In the automobile wheel, cap fixing grooves are formed intermittently along a circumferential direction in a back surface of a hub hole peripheral portion surrounding the hub hole, and the coupling protruding portions of the hub cap are fitted into the cap fixing grooves, respectively.

In order to form the cap fixing grooves in the hub hole peripheral portion in the automobile wheel proposed in Patent Literature 1, two compressing steps (a first compressing step and a second compressing step) and a cutting step are performed. In the first compressing step, punching of the hub hole and basic formation of the cap fixing grooves are performed. In the basic formation, grooves shallower than the finished cap fixing grooves are formed. In the second compressing step, compressing is performed using a drawing die and a forming punch, thereby increasing depths of the grooves formed by the basic formation. As a result, the cap fixing grooves each having a predetermined depth (depth of a finished shape) are formed. In the second compressing step, a gap is provided for discharging an excess material, which is generated at the time of the compressing, radially inward (to a hub hole center side), and the excess material is extruded into the gap. In the cutting step, the excess material extruded radially inward is cut using a hub hole trimming die and a hub hole trimming punch. In this manner, the hub hole is formed, around which the cap fixing grooves are formed.

CITATION LIST

Patent Literature

[PTL 1] JP 2003-126934 A

SUMMARY OF INVENTION

However, the automobile wheel proposed in Patent Literature 1 requires the cutting step of cutting the excess material in order to form the cap fixing grooves. Consequently, manufacturing cost is increased.

The present invention has been made in order to solve the above-mentioned problem, and has an object to provide, at low cost, an automobile wheel disk including cap fixing grooves formed in a back surface of a hub hole peripheral portion.

In order to achieve the above-mentioned object, a feature of one embodiment of the present invention resides in a method of manufacturing an automobile wheel disk (20), including:

a hub hole forming step (S2) of forming a hub hole (22) in a metal plate by punching using a press; and a fixing groove forming step (S3) of forming a plurality of fixing grooves (50), which are configured to fix a hub cap (90), along a circumferential direction of the automobile wheel disk at predetermined intervals in a back surface of a hub hole peripheral portion (30) surrounding the hub hole, the hub hole forming step including punching the metal plate so that an inner circumferential end surface of the hub hole peripheral portion (30) is formed into a shape including first inner circumferential end surfaces (31) and second inner circumferential end surfaces (32) formed alternately along the circumferential direction, each of the first inner circumferential end surfaces (31) being formed into a circular arc shape having a radius of a first length (L1) from a hub hole center, each of the second inner circumferential end surfaces (32) being formed into a circular arc shape having a radius of a second length (L2), which is smaller than the first length (L1), from the hub hole center, the fixing groove forming step including forming the plurality of fixing grooves each having a predetermined depth and a circular arc shape by squeezing in a plate thickness direction in an inner circumferential end of the hub hole peripheral portion including the first inner circumferential end surfaces, the fixing groove forming step being performed using:
  an inner die (D1), which is to be brought into abutment on the first inner circumferential end surfaces so as to prevent the hub hole peripheral portion including the first inner circumferential end surfaces from being extruded and deformed radially inward by the squeezing;
  a back die (D2), which includes protruding portions (D21) each having a shape conforming to a shape of each of the plurality of fixing grooves, and is configured to apply pressure, by the protruding portions toward a front surface side of the hub hole peripheral portion, to a back surface of the hub hole peripheral portion including the first inner circumferential end surfaces; and
  a front die (D3), which is to be arranged on the front surface side of the hub hole peripheral portion, and includes dent portions (D31) each having a depth smaller than a depth of the each of the plurality of fixing grooves and being formed at positions opposed to the protruding portions so as to be open toward the front surface side of the hub hole peripheral portion, the fixing groove forming step being performed in such a manner that the back die and the front die nip and squeeze the inner circumferential end of the hub hole peripheral portion, to thereby form the plurality of fixing grooves in the back surface of the hub hole peripheral portion, and to form circular-arc protrusions (51) on the front surface of the hub hole peripheral portion at positions opposed to the plurality of fixing grooves.

The method of manufacturing an automobile wheel disk according to the present invention includes: the step of forming the hub hole in the metal plate by punching using the press; and the step of forming the plurality of fixing grooves, which are configured to fix the hub cap, along the circumferential direction of the automobile wheel disk at the predetermined intervals in the back surface of the hub hole peripheral portion surrounding the hub hole.

The step of forming the hub hole includes punching the metal plate so that the inner circumferential end surface of the hub hole peripheral portion is formed into the shape including the first inner circumferential end surfaces and the second inner circumferential end surfaces formed alternately along the circumferential direction. Each of the first inner circumferential end surfaces is formed into the circular arc shape having the radius of the first length from the hub hole center, and each of the second inner circumferential end surfaces is formed into the circular arc shape having the radius of the second length, which is smaller than the first length, from the hub hole center. Thus, the hub hole having a toothed gear shape is formed in a center of the wheel disk.

The step of forming the plurality of fixing grooves includes forming the plurality of fixing grooves each having the predetermined depth and the circular arc shape by squeezing (coining) in the plate thickness direction in the inner circumferential end of the hub hole peripheral portion including the first inner circumferential end surfaces. Thus, the squeezing in the plate thickness direction is not performed on a region of the inner circumferential end of the hub hole peripheral portion including the second inner circumferential end surfaces. The inner die, the back die, and the front die are used to form the fixing grooves. The inner die may be formed integrally with the back die or the front die.

The inner die is arranged so as to be brought into abutment on the first inner circumferential end surfaces in order to prevent the hub hole peripheral portion including the first inner circumferential end surfaces from being extruded and deformed radially inward by the squeezing. That is, the inner die is brought into abutment on the first inner circumferential end surfaces so as to prevent an excess material of the hub hole peripheral portion from being extruded radially inward (to the hub hole center side) by the squeezing.

The back die includes the protruding portions each having the shape conforming to the shape of each of the plurality of fixing grooves, and is configured to apply pressure, by the protruding portions toward the front surface side of the hub hole peripheral portion, to the back surface of the hub hole peripheral portion including the first inner circumferential end surfaces. The front die is arranged on the front surface side of the hub hole peripheral portion, and includes the dent portions each having the depth smaller than the depth of each of the plurality of fixing grooves and being formed at the positions opposed to the protruding portions of the back die (positions opposed to the protruding portions of the back die through intermediation of the hub hole peripheral portion) so as to be open toward the front surface side of the hub hole peripheral portion.

In the step of forming the plurality of fixing grooves, under a state in which the inner die is held in abutment on the first inner circumferential end surfaces, the back die and the front die nip and squeeze the inner circumferential end of the hub hole peripheral portion. In this manner, the inner circumferential end of the hub hole peripheral portion is squeezed by the protruding portions of the back die and the dent portions of the front die. Thus, the fixing grooves are formed in the back surface of the hub hole peripheral portion. Along with this, excess materials are pushed into the dent portions so that the protrusions are formed on the front surface of the hub hole peripheral portion. A height of each of the protrusions (height protruding axially outward from the front surface of the hub hole peripheral portion) is regulated by the depth of each of the dent portions of the front die. In this case, the metal plate is compressed by the squeezing (coining). Accordingly, a height dimension of each of the protrusions formed on the front surface of the hub hole peripheral portion can be smaller than a depth dimension of each of the fixing grooves formed in the back surface of the hub hole peripheral portion.

Accordingly, without requiring the step of cutting the excess materials, the fixing grooves can be formed in the back surface of the hub hole peripheral portion. Consequently, according to the method of manufacturing a wheel disk of the present invention, manufacturing cost for forming the fixing groove can be reduced.

Further, the present invention is applicable not only to the method of manufacturing an automobile wheel disk, but also to an automobile wheel disk. A feature of one embodiment of the present invention resides in an automobile wheel disk (20), including:

a hub hole (22) formed in a center thereof;

a hub hole peripheral portion (30) surrounding the hub hole;

a plurality of fixing grooves (50) configured to fix a hub cap (90) and formed in a back surface of the hub hole peripheral portion (30) along a circumferential direction of the automobile wheel disk at predetermined intervals, the hub hole peripheral portion being formed to have an inner circumferential end surface having a shape including first inner circumferential end surfaces (31) and second inner circumferential end surfaces (32) formed alternately along the circumferential direction, each of the first inner circumferential end surfaces (31) being formed into a circular arc shape having a radius of a first length from a hub hole center, each of the second inner circumferential end surfaces (32) being formed into a circular arc shape having a radius of a second length, which is smaller than the first length, from the hub hole center, the plurality of fixing grooves (50) each having a predetermined depth and being formed into a circular arc shape in a back surface of an inner circumferential end of the hub hole peripheral portion (41) including the first inner circumferential end surfaces; and protrusions (51) formed at positions opposed to the plurality of fixing grooves on a front surface of the inner circumferential end of the hub hole peripheral portion including the first inner circumferential end surfaces, each of the protrusions (51) having a circular arc shape and a height dimension (b) smaller than a depth dimension (a) of each of the plurality of fixing grooves.

The automobile wheel disk according to the present invention includes: the hub hole formed in the center thereof; the hub hole peripheral portion surrounding the hub hole; and the plurality of fixing grooves configured to fix the hub cap and formed in the back surface of the hub hole peripheral portion along the circumferential direction at the predetermined intervals. The hub hole peripheral portion is formed to have the inner circumferential end surface having the shape including the first inner circumferential end surfaces and the second inner circumferential end surfaces formed alternately along the circumferential direction. Each of the first inner circumferential end surfaces is formed into the circular arc shape having the radius of the first length from the hub hole center, and each of the second inner circumferential end surfaces is formed into the circular arc shape having the radius of the second length, which is smaller than the first length, from the hub hole center. That is, the hub hole has a toothed gear shape.

Further, the plurality of fixing grooves each having the predetermined depth are formed into the circular arc shape in the back surface of the inner circumferential end of the hub hole peripheral portion including the first inner circumferential end surfaces, and the protrusions are formed at the positions opposed to the plurality of fixing grooves on the front surface of the inner circumferential end of the hub hole peripheral portion. Each of the protrusions has the circular arc shape and the height dimension smaller than the depth dimension of each of the plurality of fixing grooves. Thus, according to the automobile wheel disk of the present invention, the fixing grooves each having the predetermined depth can be formed by the squeezing (coining), and manufacturing cost can be reduced. Further, the height dimension of each of the protrusions can be reduced. Thus, the protrusions are less liable to obstruct mounting work of the hub cap.

Further, another feature of one embodiment of the present invention resides in an automobile wheel disk, in which the hub hole peripheral portion includes an inclined portion (43) bulging to a front side of the automobile wheel disk from a radially outer side of the each of the first inner circumferential end surfaces toward the each of the first inner circumferential end surfaces so that a region having the each of the plurality of fixing grooves is positioned frontward of a region to be brought into abutment on an axle hub (100).

According to the present invention, the hub hole peripheral portion includes the inclined portion bulging to the front side of the automobile wheel disk (axially outward) from the radially outer side of the each of the first inner circumferential end surfaces toward the each of the first inner circumferential end surfaces. Owing to the inclined portion, the region of the hub hole peripheral portion having the each of the plurality of fixing grooves is positioned frontward of the region to be brought into abutment on the axle hub. Thus, a sufficient space for fixing a locking piece of the hub cap in each of the fixing grooves can be secured between each of the fixing grooves and the axle hub.

It should be noted that, in the above description, in order to assist understanding of the present invention, reference symbols with parentheses used in the embodiment are added to the components according to the present invention corresponding to the components according to the embodiment. However, the components according to the present invention are not limited to the embodiment specified by the above-mentioned reference symbols.

DESCRIPTION OF EMBODIMENTS

Figure 1:
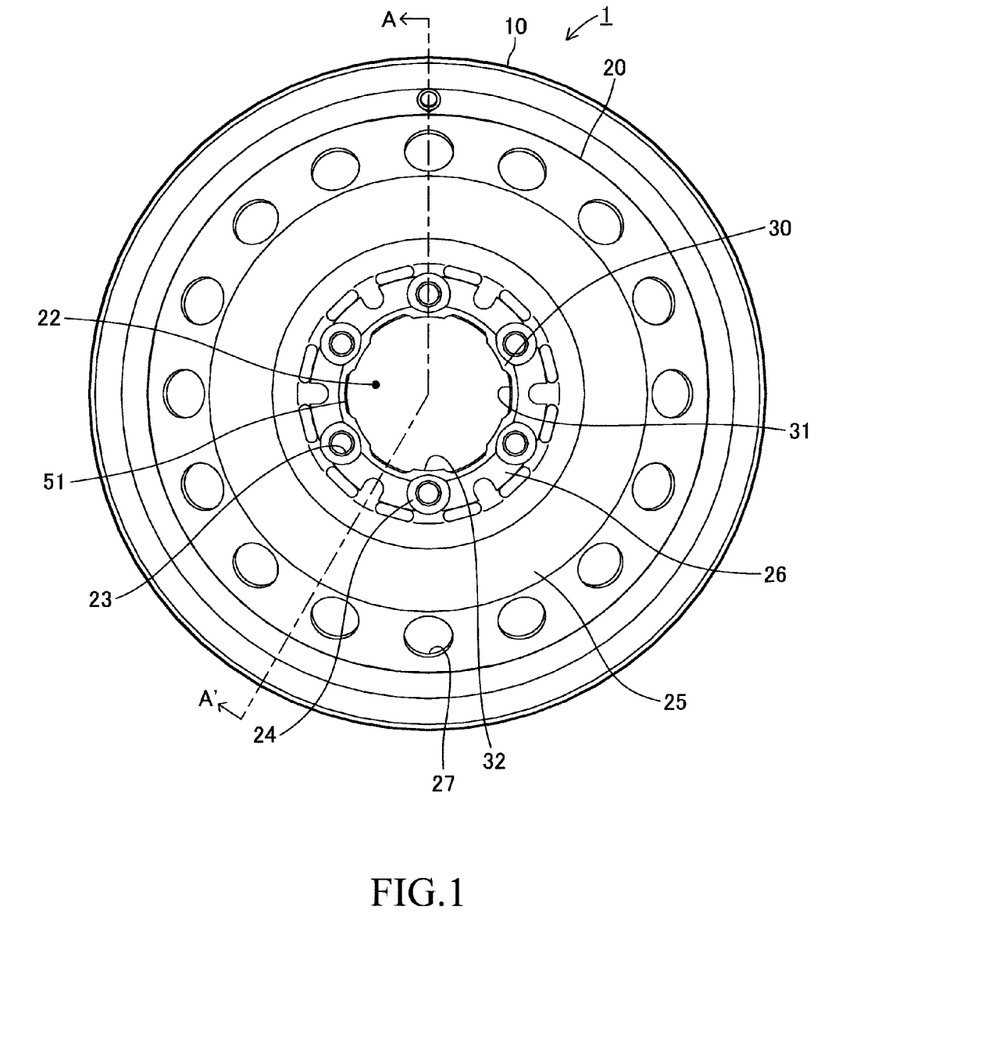
FIG. 1 is a front view of an automobile wheel according to an embodiment of the present invention.
Figure 2:
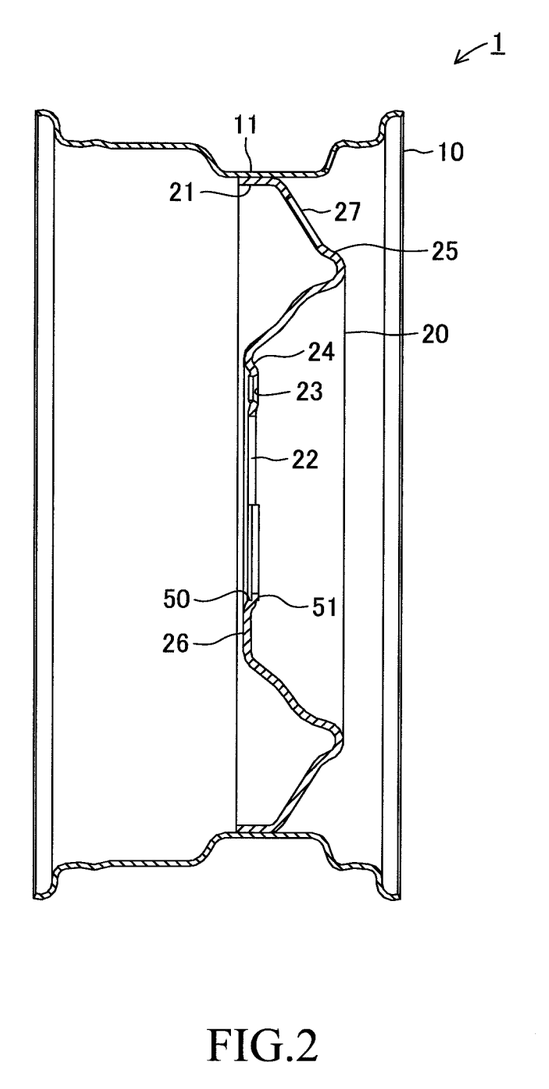
FIG. 2 is a sectional view taken along the line A-A' of FIG. 1.

Now, an embodiment of the present invention is described in detail with reference to the drawings. FIG. 1 and FIG. 2 are illustrations of an automobile wheel according to the embodiment. An automobile wheel 1 includes a steel wheel rim 10 and a steel wheel disk 20. As illustrated in FIG. 2, the automobile wheel 1 is integrally formed in such a manner that, after a flange portion 21 of the wheel disk 20 is fitted onto an inner circumferential surface of a well portion 11 of the wheel rim 10, which is a cylindrical portion having a smallest diameter, a distal end region of the flange portion 21 is joined to the well portion 11 by a variety of welding methods such as arc welding, spot welding, and laser welding.

In the automobile wheel 1 illustrated in FIG. 2, the left side of FIG. 2 corresponds to an inner side in a vehicle width direction, and the right side of FIG. 2 corresponds to an outer side in the vehicle width direction. In the following, the outer side of the wheel disk 20 in the vehicle width direction is referred to as a front side or a front surface, and the inner side of the wheel disk 20 in the vehicle width direction is referred to as a back side or a back surface. The back surface of the wheel disk 20 corresponds to a surface to be coupled to an axle hub 100 (see FIG. 7), and the front surface of the wheel disk 20 corresponds to a decorative surface. Further, a rotation center axis of the automobile wheel 1 is referred to as a wheel axis, and a direction orthogonal to the wheel axis is referred to as a radial direction.

Figure 7:
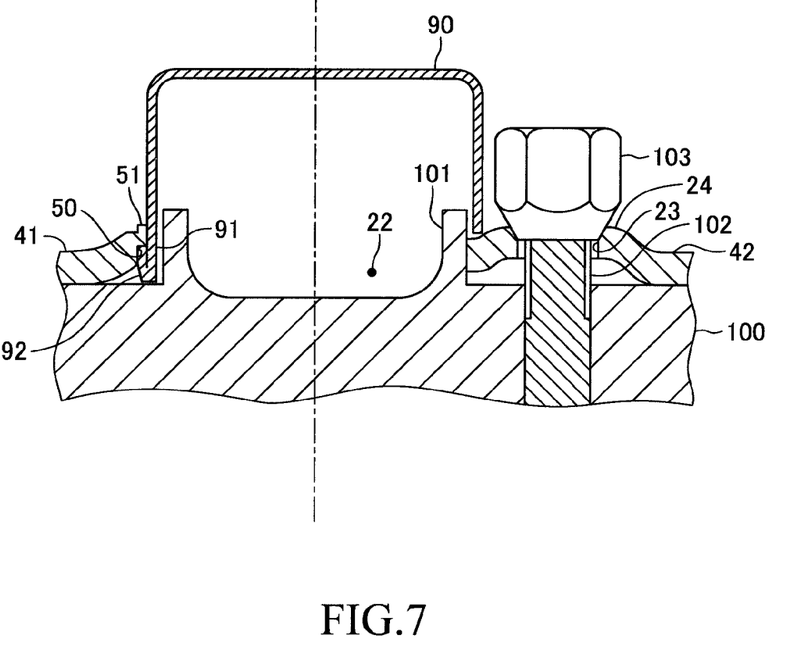
FIG. 7 is a sectional view for illustrating a state in which the automobile wheel and a hub cap are mounted to each other.

A hub hole 22 is formed in a center of the wheel disk 20, and a plurality of nut seats 24 each having a bolt hole 23 formed therein are formed equiangularly around the hub hole 22. As illustrated in FIG. 7, the hub hole 22 is a through-hole through which a cylindrical portion 101 formed at a distal end of the axle hub 100 is to be inserted. The bolt hole 23 is a through-hole through which each of stud bolts 102 fixed to the axle hub 100 is to be inserted. On a radially outer side of an array of the nut seats 24, an annular hat portion 25 is formed to swell to an outer side (front side) of the wheel axis direction. A portion on a radially inner side of the hat portion 25 is a hub coupling portion 26 to be coupled to the axle hub 100. Further, a portion on a radially outer side of the hat portion 25 is the flange portion 21 to be welded and joined to the wheel rim 10. A plurality of heat dissipating holes 27 are formed equiangularly in the hat portion 25.

Figure 3:
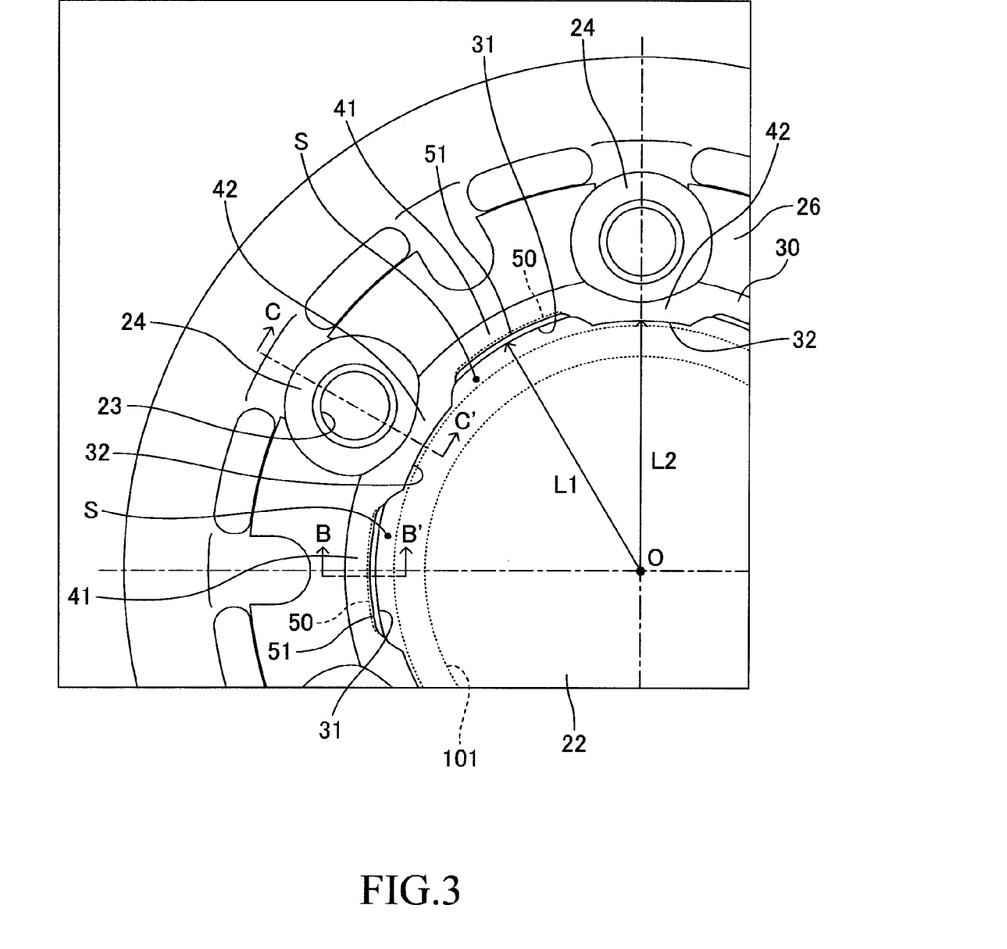
FIG. 3 is a partial enlarged front view of a hub coupling portion.

A part of the hub coupling portion 26 surrounding a periphery of the hub hole 22 is referred to as a hub hole peripheral portion 30. FIG. 3 is an enlarged view of a part of the hub coupling portion 26. The hub hole peripheral portion 30 is formed to have an inner circumferential end surface that faces the hub hole 22 and includes first inner circumferential end surfaces 31 and second inner circumferential end surfaces 32 formed alternately along a circumferential direction. The first inner circumferential end surfaces 31 are each formed into a circular arc shape having a radius of a first length L1 from a hub hole center O, and the second inner circumferential end surfaces 32 are each formed into a circular arc shape having a radius of a second length L2, which is smaller than the first length L1, from the hub hole center O. Thus, the hub hole 22 is formed into a toothed gear shape in front view.

As illustrated in FIG. 7, the automobile wheel 1 is fastened to the axle hub 100 in such a manner that nuts 103 are fastened to the stud bolts 102 under a state in which the cylindrical portion 101 of the axle hub 100 is inserted through the hub hole 22 and the stud bolts 102 are inserted through the bolt holes 23. A hub cap 90 is mounted to the hub hole peripheral portion 30 from the front surface side of the wheel disk 20 so as to cover the hub hole 22. In this manner, the axle hub 100 is covered with the hub cap 90, thereby being capable of enhancing a decorative appearance.

As described above, the hub hole 22 is formed into a toothed gear shape. Accordingly, as illustrated in FIG. 3, gaps S each exhibiting a circular arc shape in front view are defined at predetermined intervals between an outer circumferential surface of the cylindrical portion 101 of the axle hub 100 and the first inner circumferential end surfaces 31 of the hub hole peripheral portion 30. Each of the gaps S is a space into which a locking piece 91 of the hub cap 90 illustrated in FIG. 7 is to be inserted. In this embodiment, as illustrated in FIG. 3, a circumferential position of each of the first inner circumferential end surfaces 31 is set between the adjacent nut seats 24. Accordingly, it is possible to define the gaps S each having a width (radial width) large enough to insert the locking piece 91 of the hub cap 90 thereinto while securing a sufficient distance between the outer circumferential surface of the cylindrical portion 101 of the axle hub 100 and the bolt holes 23.

In the following, a part of the hub hole peripheral portion 30 including the first inner circumferential end surface 31 and extending radially outward from the first inner circumferential end surface 31 is referred to as a first hub hole peripheral portion 41, and a part of the hub hole peripheral portion 30 including the second inner circumferential end surface 32 and extending radially outward from the second inner circumferential end surface 32 is referred to as a second hub hole peripheral portion 42.

Figure 5:
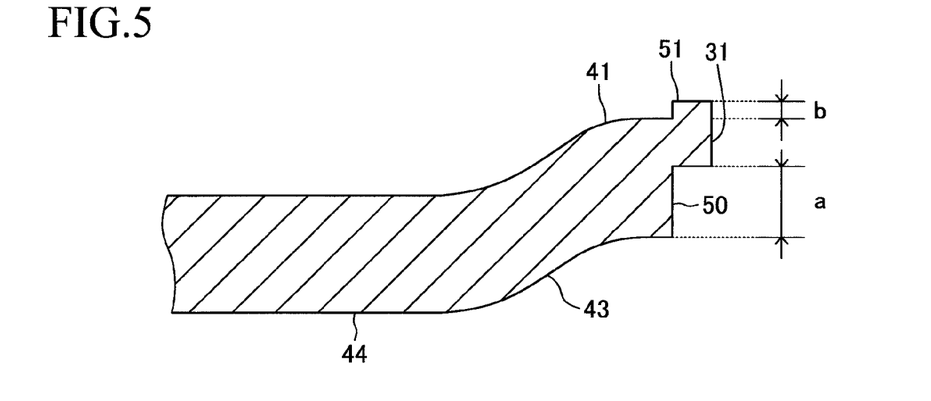
FIG. 5 is a sectional view of a first hub hole peripheral portion.

A fixing groove 50 configured to lock and fix the locking piece 91 of the hub cap 90 therein is formed in a back surface of the first hub hole peripheral portion 41. Meanwhile, the fixing groove 50 is not formed in a back surface of the second hub hole peripheral portion 42. The fixing groove 50 is a groove formed in parallel to the first inner circumferential end surface 31 so as to have a predetermined width (radial width) and a circular arc shape in back view. As illustrated in FIG. 5, in cross-section taken along a plane including the wheel axis (cross-section taken along the line B-B' of FIG. 3), the fixing groove 50 exhibits a stepped shape dented in an L shape.

As illustrated in FIG. 5, an inclined portion 43 is formed in the first hub hole peripheral portion 41 to bulge to the front side (axially outer side) from the radially outer side of the first inner circumferential end surface 31 toward the first inner circumferential end surface 31. That is, the first hub hole peripheral portion 41 includes an abutment portion 44 formed on the radially outer side thereof so as to be brought into abutment on the axle hub 100, and includes the inclined portion 43 formed between the abutment portion 44 and the first inner circumferential end surface 31 so as to bulge to the front side toward the hub hole center O. Accordingly, the radially inner side of the first hub hole peripheral portion 41 is not brought into abutment on the axle hub 100. In a vehicle in which a brake disk is mounted to the axle hub 100, the wheel disk 20 is coupled to the axle hub 100 through intermediation of the brake disk. However, in the specification of the present invention, the brake disk is described as a part of the axle hub 100 without distinguishing the axle hub 100 and the brake disk from each other.

A protrusion 51 is formed on the front surface of the first hub hole peripheral portion 41 at a position opposed to the fixing groove 50 formed in the back surface of the first hub hole peripheral portion 41. Along with formation of the fixing groove 50, the protrusion 51 is formed in a fixing groove forming step described later. In front view, the protrusion 51 exhibits substantially the same shape as the shape of the fixing groove 50 in back view. Thus, the protrusion 51 is formed along the first inner circumferential end surface 31 so as to have a predetermined width (radial dimension) and a circular arc shape in front view.

FIG. 7 is a sectional view for illustrating a state in which the hub cap 90 is mounted. The left side with respect to a center line in FIG. 7 is an illustration of a cross-section of the first hub hole peripheral portion 41, and the right side thereof is an illustration of a cross-section of the second hub hole peripheral portion 42. The hub cap 90 is formed into a bottomed cylindrical body, and the locking pieces 91 are formed at an opening end of the hub cap 90 at predetermined intervals in the circumferential direction to extend in an axial direction. A distal end of each of the locking pieces 91 is folded radially outward. The folded portion serves as a wedge-shaped locking claw 92. The hub cap 90 is mounted to the hub hole peripheral portion 30 in such a manner that an opening portion of the hub cap 90 is opposed to the cylindrical portion 101 of the axle hub 100, and then each of the locking pieces 91 is inserted into the gap S defined between the cylindrical portion 101 of the axle hub 100 and each of the first inner circumferential end surfaces 31. In this case, each of the locking pieces 91 moves radially outward due to its own elasticity so that the locking claw 92 is fitted into the fixing groove 50 formed in the back surface of the first hub hole peripheral portion 41. In this manner, the hub cap 90 is stably fixed to the hub hole peripheral portion 30.

Figure 4:
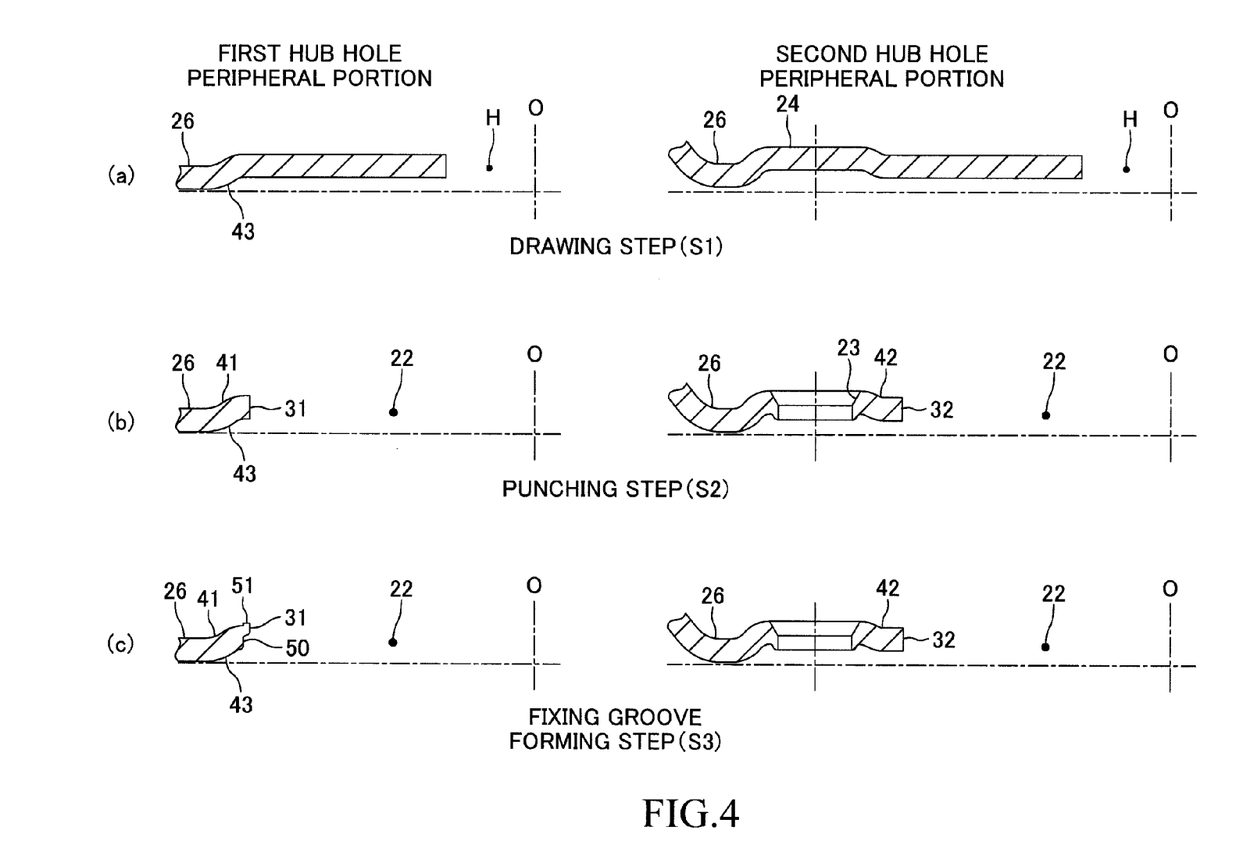
FIG. 4 are sectional views each for illustrating a step of processing a hub hole peripheral portion.

Next, a method of forming the wheel disk 20 is described with reference to FIGS. 4. A characteristic step of the present invention is the fixing groove forming step. Thus, hitherto known methods may be adopted as the other steps of the present invention. The wheel disk 20 is formed using a disk base material obtained by cutting each of four corners of a flat and substantially square steel plate into a circular arc shape. First, a drawing step S1 is performed. In the drawing step S1, concavo-convex shapes of the hub coupling portion 26, the hat portion 25, the nut seats 24, the flange portion 21, and the like are formed in the disk base material by press working. The drawing step is performed in a plurality of divided processes. First, a circular hole H through which a positioning pin is to be inserted is punched in a center of the disk base material. FIG. 4(a) is an illustration of a cross-section of the hub coupling portion 26 after the drawing step S1. The left side of FIG. 4(a) is an illustration of a cross-section of a side on which the first hub hole peripheral portion 41 is to be formed (cross-section taken along a line obtained by extending the line B-B' of FIG. 3 to the center O), and the right side of FIG. 4(a) is an illustration of a cross-section of a side on which the second hub hole peripheral portion 42 is to be formed (cross-section taken along a line obtained by extending the line C-C' of FIG. 3 to the center O). In the drawing step S1, the inclined portion 43 is also formed on the side on which the first hub hole peripheral portion 41 is to be formed.

Subsequently, a punching step S2 is performed. In the punching step S2, as illustrated in FIG. 4(b), the hub hole 22 and the bolt holes 23 are formed by punching using a press. Thus, the punching step S2 corresponds to a hub hole forming step according to the present invention. In the punching step, the hub hole 22 is formed and punched into a toothed gear shape including circular-arc contours each having a radius of the first length L1 from the hub hole center O, and circular-arc contours each having a radius of the second length L2, which is smaller than the first length L1, from the hub hole center O. The circular-arc contours each having the radius of the first length L1, and the circular-arc contours each having the radius of the second length L2 are arranged alternately. In this manner, the inner circumferential end surface of the hub hole is formed to include the first inner circumferential end surfaces 31 and the second inner circumferential end surfaces 32 formed alternately as described above. The heat dissipating holes 27 are also formed in the punching step S2, but may be formed in a step other than the step of forming the hub hole 22 and the bolt holes 23.

Figure 6:
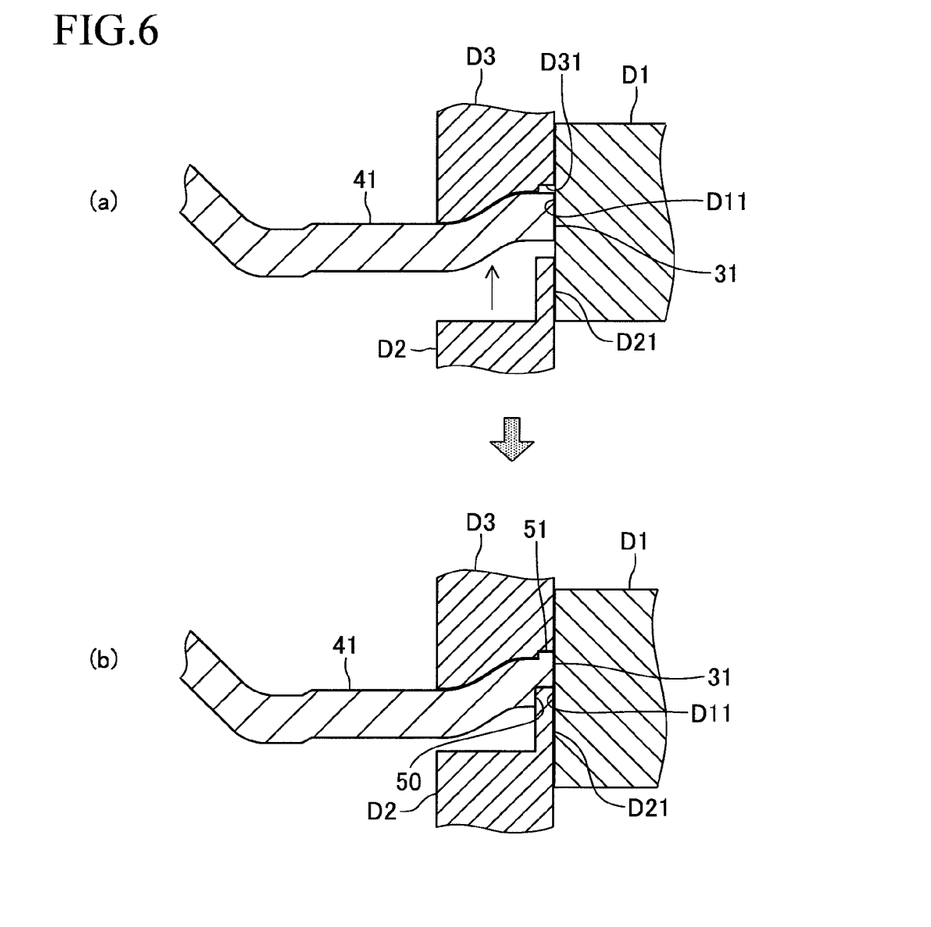
FIG. 6 are explanatory views for illustrating movement of dies in a fixing groove forming step.
Figure 8:
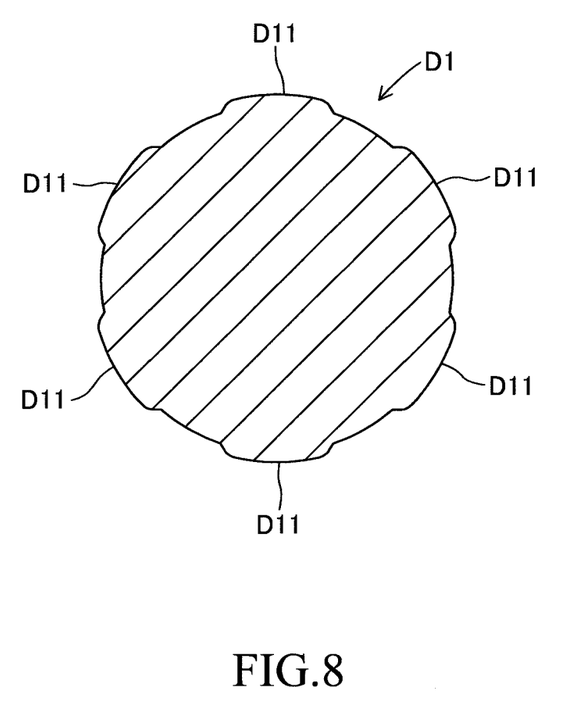
FIG. 8 is a sectional view of an inner die taken along a plane perpendicular to an axial direction thereof.

Subsequently, a fixing groove forming step S3 is performed. In the fixing groove forming step S3, squeezing (coining) is performed on inner circumferential ends of the first hub hole peripheral portions 41 in a plate thickness direction. As illustrated in FIG. 4(c), the fixing grooves 50 each having a predetermined depth and a circular arc shape are formed in a back surface of the disk base material, and the protrusions 51 each having a predetermined height and a circular arc shape are formed on a front surface of the disk base material. In the fixing groove forming step S3, as illustrated in FIGS. 6, an inner die D1, a back die D2, and a front die D3 are used. The inner die D1 is a columnar body including abutment wall surfaces D11 to be brought into abutment on all of the first inner circumferential end surfaces 31, respectively. For example, as illustrated in FIG. 8, the inner die D1 is the columnar body having the same sectional shape (sectional shape taken along the radial direction) as the shape (toothed gear shape) of the hub hole 22 in front view. The inner die D1 is arranged to be inserted through the hub hole 22 such that a central axis of the inner die D1 corresponds to the wheel axis so that the abutment wall surfaces Dl 1 are brought into abutment on all of the first inner circumferential end surfaces 31, respectively.

Figure 9:
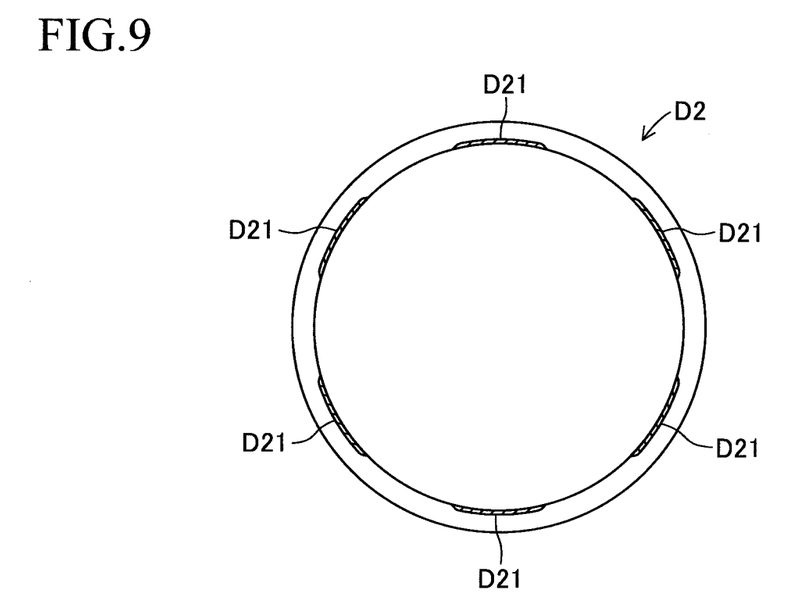
FIG. 9 is a sectional view of a back die taken along a plane including positions of protruding portions and perpendicular to an axial direction of the back die.

As illustrated in FIGS. 6 and FIG. 9, the back die D2 is a cylindrical body having an inner radius L1, which is to be arranged on the back surface side of the hub hole peripheral portion 30. Protruding portions D21 each having a circular arc shape (circular arc shape in radial cross-section) conforming to the shape of the fixing groove 50 are formed at a distal end of the back die D2. The back die D2 is arranged on an outer circumference of the inner die D1, and is arranged so that an inner circumferential surface of the back die D2 is slidable in the wheel axis direction along an outer circumferential surface (abutment wall surfaces D11) of the inner die Dl.

Figure 10:
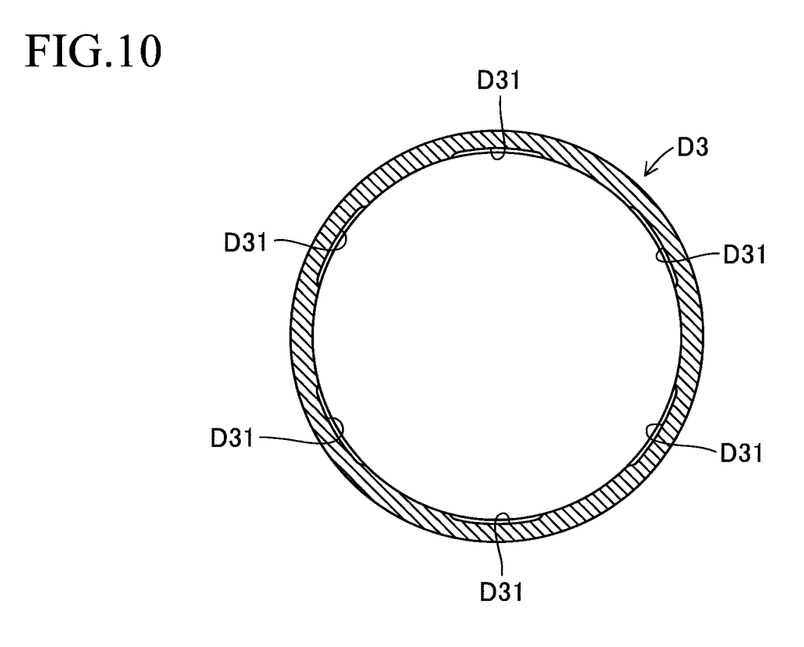
FIG. 10 is a sectional view of a front die taken along a plane including positions of dents and perpendicular to an axial direction of the front die.

As illustrated in FIGS. 6 and FIG. 10, the front die D3 is a cylindrical body having the inner radius L1, which is to be arranged on the front surface side of the hub hole peripheral portion 30 and is configured to retain the front surface of the hub hole peripheral portion 30. At positions opposed to the protruding portions D21 of the back die D2 in a surface of the front die D3, which is opposed to the front surface of the hub hole peripheral portion 30, dent portions D31 each having a depth smaller than a depth of the fixing groove 50 are formed so as to be open to the front surface side of the hub hole peripheral portion 30. Each of the dent portions D31 (spaces) has the same circular-arc sectional shape as the sectional shape of each of the protruding portions D21.

In the fixing groove forming step S3, under a state in which the abutment wall surfaces D11 of the inner die D1 are held in abutment on the first inner circumferential end surfaces 31, the back die D2 and the front die D3 nip and squeeze the inner circumferential end of the hub hole peripheral portion 30 in the plate thickness direction. In this case, the back die D2 may be moved as illustrated in FIGS. 6. Alternatively, the front die D3 may be moved, or the back die D2 and the front die D3 may be moved so as to approach each other. In this manner, the inner circumferential ends of the first hub hole peripheral portions 41 are squeezed by the protruding portions D21 of the back die D2 and the dent portions D31 of the front die D3. Then, as illustrated in FIG. 5, the fixing grooves 50 are formed in the back surfaces of the first hub hole peripheral portions 41. Along with this, excess materials are pushed into the dent portions D31, thereby forming the protrusions 51 on the front surface of the hub hole peripheral portion 30. In this case, the inner die D1 is held in abutment on the first inner circumferential end surfaces 31 so that the hub hole peripheral portion 30 is neither extruded nor deformed radially inward due to nipping pressure applied by the back die D2 and the front die D3. Thus, it is possible to form the fixing grooves 50 while maintaining a radial dimension of the hub hole peripheral portion 30 to a predetermined dimension.

A height (height protruding axially outward from the front surface of the first hub hole peripheral portion 41) of each protrusion 51 formed on the front surface of the first hub hole peripheral portion 41 is regulated by the depth of each dent portion D31 of the front die D3. In this case, the inner circumferential end of the first hub hole peripheral portion 41 is compressed in the plate thickness direction by squeezing (coining). Accordingly, as illustrated in FIG. 5, a height dimension "b" of the protrusion 51 formed on the front surface of the first hub hole peripheral portion 41 can be smaller than a depth dimension "a" of the fixing groove 50 formed in the back surface of the first hub hole peripheral portion 41.

After the fixing groove forming step S3 is completed, final shaping and the like are performed. Thus, the wheel disk 20 is completed.

According to the above-mentioned method of manufacturing the wheel disk of this embodiment, in the fixing groove forming step S3, under a state in which the inner die D1 is held in abutment on the first inner circumferential end surfaces 31, the back die D2 and the front die D3 nip and squeeze the inner circumferential ends of the first hub hole peripheral portions 41, thereby forming the fixing grooves 50. Accordingly, a step of cutting the excess material is not required. Thus, manufacturing cost for forming the fixing grooves 50 can be reduced. Further, the squeezing enables the height dimension of each of the protrusions 51 to be reduced. Thus, the protrusions 51 of the wheel disk 20 according to this embodiment are less liable to obstruct mounting work of the hub cap 90. Further, each of the inclined portions 43 is formed so as to prevent the inner circumferential end (region in which each of the fixing grooves 50 is formed) of the first hub hole peripheral portion 41 from being brought into abutment on the axle hub 100. Accordingly, a sufficient space into which the locking piece 91 (locking claw 92) of the hub cap 90 is to be inserted can be secured between each of the fixing grooves 50 and the axle hub 100.

The automobile wheel according to the embodiment is described above, but the present invention is not limited to the above-mentioned embodiment, and various modifications may be made without departing from the object of the present invention.

For example, in this embodiment, the inner die D1 is formed separately from the back die D2 and the front die D3, but may be formed integrally with the back die D2 or the front die D3. For example, a die D4 illustrated in FIG. 11 and FIGS. 12 may be used. The die D4 is a columnar body including abutment wall surfaces D41 to be brought into abutment on the first inner circumferential end surfaces 31, respectively. A protruding portion D42 configured to form the fixing groove 50 is integrally formed on each of the abutment wall surfaces D41. That is, the die D4 has a configuration obtained by integrally forming the protruding portions D21 of the back die D2 on the above-mentioned abutment wall surfaces D11 of the inner die D1, respectively. According to this modified example, the number of the dies can be reduced.

Figure 11:
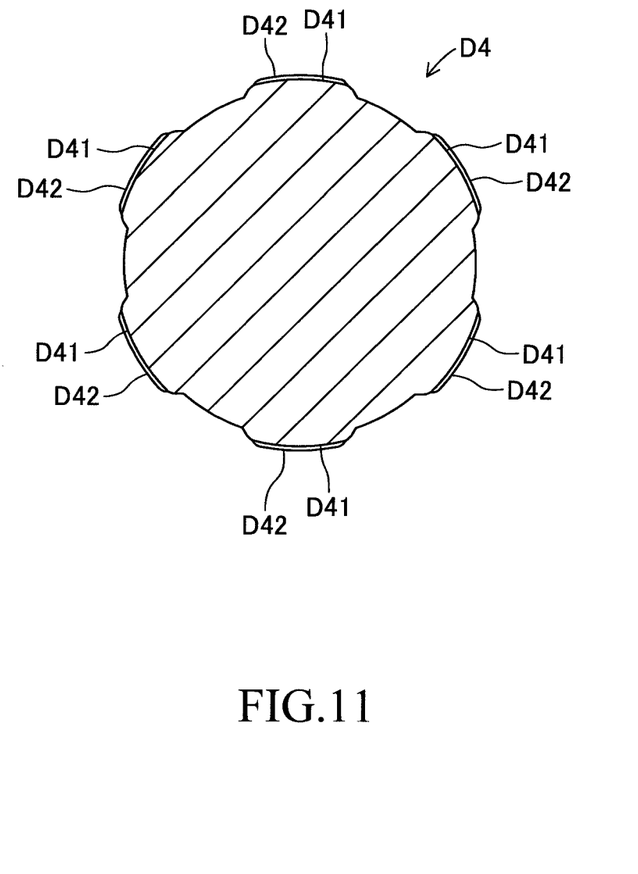
FIG. 11 is a sectional view of an inner die according to a modified example taken along a plane perpendicular to an axial direction thereof.
Figure 12:
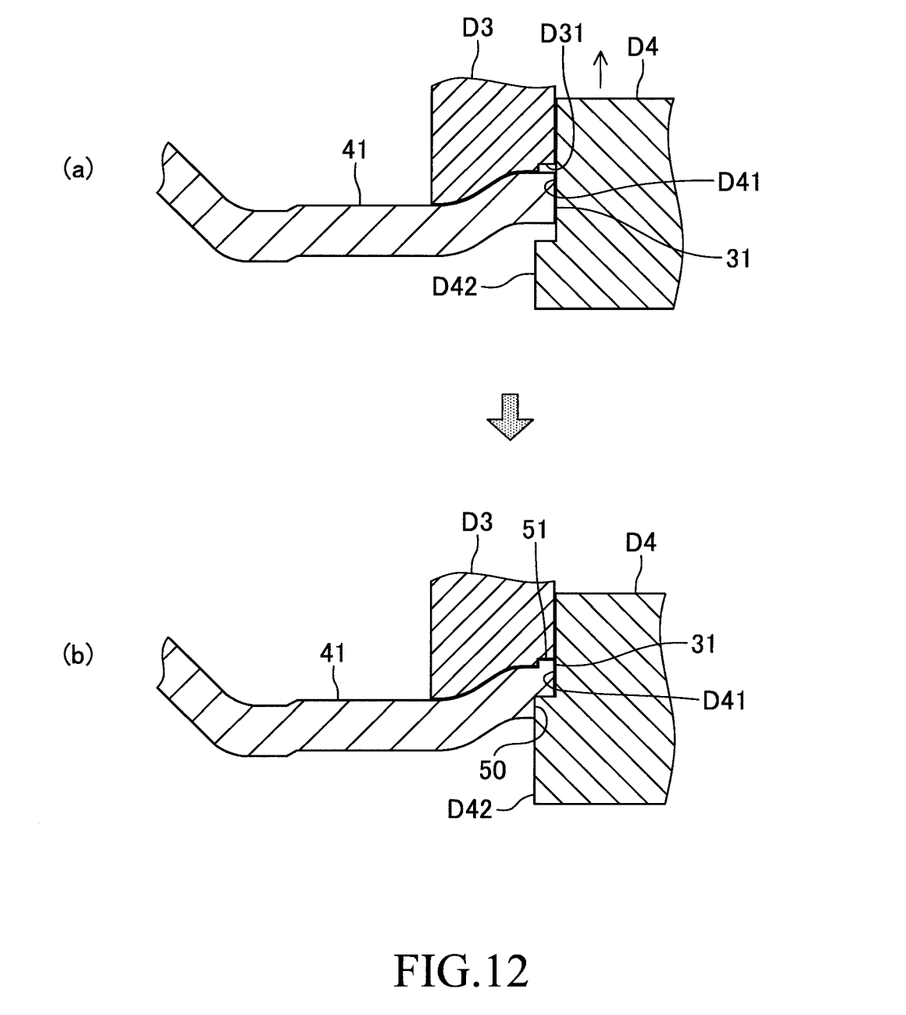
FIG. 12 are explanatory views for illustrating movement of dies according to the modified example in the fixing groove forming step.

Further, the inner die D1 according to this embodiment or the die D4 according to the above-mentioned modified example has such a shape as to be brought into abutment on both of the first inner circumferential end surfaces 31 and the second inner circumferential end surfaces 32, but it is not always necessary for the inner die D1 or the die D4 to be brought into abutment on the second inner circumferential end surfaces 32. It is only necessary for the inner die D1 or the die D4 to be brought into abutment on the first inner circumferential end surfaces 31.

Further, in this embodiment, the circumferential position, at which each fixing groove 50 is to be formed, is set between the adjacent nut seats 24, but it is not always necessary to set the circumferential position between the adjacent nut seats 24. Each of the fixing grooves 50 may be formed on the radially inner side of each of the nut seats 24. Further, it is not always necessary for each of the fixing grooves 50 to be formed at every position between the adjacent nut seats 24 (six positions in this embodiment). For example, each of the fixing grooves 50 may be formed at every other position between the adjacent nut seats 24 (for example, three positions).

Further, in this embodiment, the punching step S2 is performed after the drawing step S1 is performed. Instead, before the drawing step S1 is performed, the punching step S2 may be performed to form the hub hole 22, and then the drawing step S1 may be performed to form a concavo-convex shape of the hub hole peripheral portion 30.

The invention claimed is:

1. A method of manufacturing an automobile wheel disk, comprising the steps of:
   forming a hub hole in a metal plate by punching using a press; and
   forming a plurality of fixing grooves, which are configured to fix a hub cap, along a circumferential direction of the automobile wheel disk at predetermined intervals in a back surface of a hub hole peripheral portion surrounding the hub hole,
   the forming the hub hole comprising punching the metal plate so that an inner circumferential end surface of the hub hole peripheral portion is formed into a shape comprising first inner circumferential end surfaces and second inner circumferential end surfaces formed alternately along the circumferential direction, each of the first inner circumferential end surfaces being formed into a circular arc shape having a radius of a first length from a hub hole center, each of the second inner circumferential end surfaces being formed into a circular arc shape having a radius of a second length, which is smaller than the first length, from the hub hole center,
   the forming the plurality of fixing grooves comprising forming the plurality of fixing grooves each having a predetermined depth and a circular arc shape by squeezing in a plate thickness direction in an inner circumferential end of the hub hole peripheral portion comprising the first inner circumferential end surfaces,
   the forming the plurality of fixing grooves being performed using:
      an inner die, which is to be brought into abutment on the first inner circumferential end surfaces so as to prevent the hub hole peripheral portion comprising the first inner circumferential end surfaces from being extruded and deformed radially inward by the squeezing;
      a back die, which comprises protruding portions each having a shape conforming to a shape of each of the plurality of fixing grooves, and is configured to apply pressure, by the protruding portions toward a front surface side of the hub hole peripheral portion, to a back surface of the hub hole peripheral portion comprising the first inner circumferential end surfaces; and
      a front die, which is to be arranged on the front surface side of the hub hole peripheral portion, and comprises dent portions each having a depth smaller than a depth of the each of the plurality of fixing grooves and being formed at positions opposed to the protruding portions so as to be open toward the front surface side of the hub hole peripheral portion,
   the forming the plurality of fixing grooves being performed in such a manner that the back die and the front die nip and squeeze the inner circumferential end of the hub hole peripheral portion, to thereby form the plurality of fixing grooves in the back surface of the hub hole peripheral portion, and to form circular-arc protrusions on the front surface of the hub hole peripheral portion at positions opposed to the plurality of fixing grooves.

2. An automobile wheel disk, comprising:
   a hub hole formed in a center thereof;
   a hub hole peripheral portion surrounding the hub hole;
   a plurality of fixing grooves configured to fix a hub cap and formed in a back surface of the hub hole peripheral portion along a circumferential direction of the automobile wheel disk at predetermined intervals,
      the hub hole peripheral portion being formed to have an inner circumferential end surface having a shape comprising first inner circumferential end surfaces and second inner circumferential end surfaces formed alternately along the circumferential direction, each of the first inner circumferential end surfaces being formed into a circular arc shape having a radius of a first length from a hub hole center, each of the second inner circumferential end surfaces being formed into a circular arc shape having a radius of a second length, which is smaller than the first length, from the hub hole center, the plurality of fixing grooves each having a predetermined depth and being formed into a circular arc shape in a back surface of an inner circumferential end of the hub hole peripheral portion comprising the first inner circumferential end surfaces; and protrusions formed at positions opposed to the plurality of fixing grooves on a front surface of the inner circumferential end of the hub hole peripheral portion comprising the first inner circumferential end surfaces, each of the protrusions having a circular arc shape and a height dimension smaller than a depth dimension of each of the plurality of fixing grooves.

3. An automobile wheel disk according to claim 2, wherein the hub hole peripheral portion comprises an inclined portion bulging to a front side of the automobile wheel disk from a radially outer side of the each of the first inner circumferential end surfaces toward the each of the first inner circumferential end surfaces so that a region having the each of the plurality of fixing grooves is positioned frontward of a region to be brought into abutment on an axle hub.

\* \* \* \* \*